United States Patent
Yang et al.

(10) Patent No.: US 8,149,571 B2
(45) Date of Patent: Apr. 3, 2012

(54) PORTABLE ELECTRONIC DEVICE

(75) Inventors: Mu-Wen Yang, Taipei Hsien (TW); Chih-Chiang Chang, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 224 days.

(21) Appl. No.: 12/544,778

(22) Filed: Aug. 20, 2009

(65) Prior Publication Data

US 2010/0259872 A1 Oct. 14, 2010

(30) Foreign Application Priority Data

Apr. 13, 2009 (CN) .......................... 2009 1 0301536

(51) Int. Cl.
*H05K 7/16* (2006.01)

(52) U.S. Cl. .............. 361/679.01; 361/679.55; 361/727; 455/575.4; 455/575.3

(58) Field of Classification Search ............. 361/679.01, 361/679.55, 679.09, 679.08, 679.26, 724–727; 248/917–924; 455/575.1–575.4
See application file for complete search history.

(56) References Cited

U.S. PATENT DOCUMENTS

| | | | |
|---|---|---|---|
| 5,494,447 A * | 2/1996 | Zaidan | 439/31 |
| 6,351,372 B1 * | 2/2002 | Kim | 361/679.15 |
| 7,031,758 B2 * | 4/2006 | Chang | 455/575.1 |
| 2006/0128190 A1 * | 6/2006 | Kato | 439/157 |
| 2009/0181733 A1 * | 7/2009 | Demuycnk | 455/575.3 |
| 2009/0291357 A1 * | 11/2009 | Hua | 429/100 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

A portable electronic device comprises a cover and a body. The cover comprises a first end wall, a second end wall opposite to the first end wall, and a sidewall connecting the first end wall and the second end wall. The sidewall defines a sliding slot. Two ends of the sliding slot respectively extend to the first end wall and the second end wall. The body comprises a protrusion formed thereon. The protrusion is slidably received in the sliding slot. The protrusion slides to the first end wall or the second end wall, whereby the cover hinges on the protrusion relative to the body.

15 Claims, 7 Drawing Sheets

PORTABLE ELECTRONIC DEVICE

BACKGROUND

1. Technical Field

The present disclosure relates to portable electronic devices, particularly, to dual-display portable electronic devices.

2. Description of Related Art

Portable electronic devices are often available in a hinged form factor. This type of device is widely used.

The hinged portable electronic devices often include a body and a cover hinged thereon. The body can include a keypad and the cover can include an exterior display and an interior display. The exterior display is typically small in area, and provides information, such as alarm clock, time, battery power, and other statistical details. The exterior display consumes little power. The interior display is typically larger, and provides more detailed operational details and functions of the device. Thus, the interior display consumes more power. In use, the cover must hinge open from the body to expose the keypad and illuminate the interior display.

However, to adjust the time, alarm clock, and other settings, the interior display must be illuminated to operate the keypad, thus consuming power.

Therefore, there is room for improvement within the art.

BRIEF DESCRIPTION OF THE DRAWINGS

Many aspects of the portable electronic device can be better understood with reference to the following drawings. These drawings are not necessarily drawn to scale, the emphasis instead being placed upon clearly illustrating the principles of the present portable electronic device. Moreover, in the drawings like reference numerals designate corresponding sections throughout the several views.

DETAILED DESCRIPTION

Figure 1:
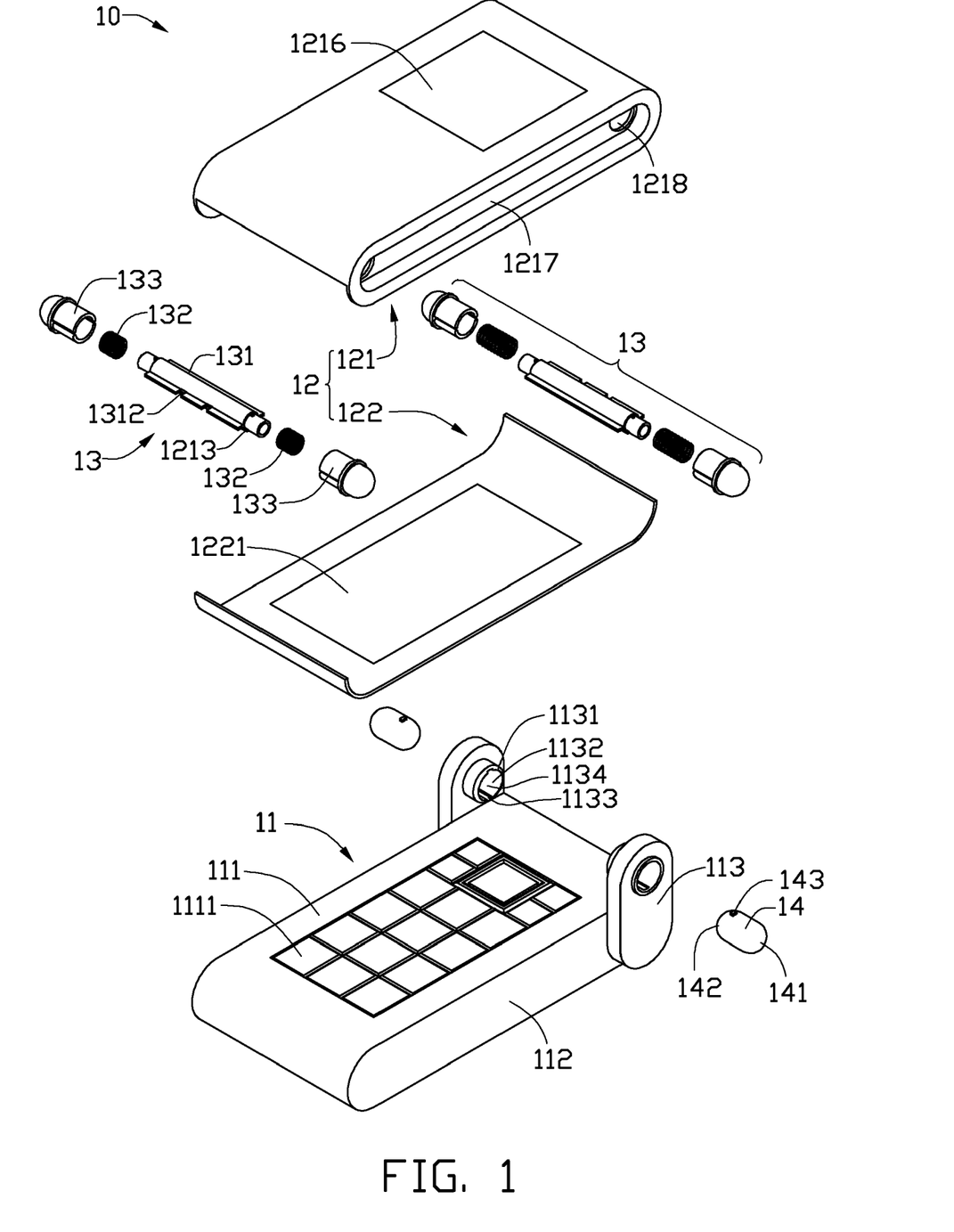
FIG. 1 is an exploded, isometric view of a portable electronic device, in accordance with an exemplary embodiment.
Figure 2:
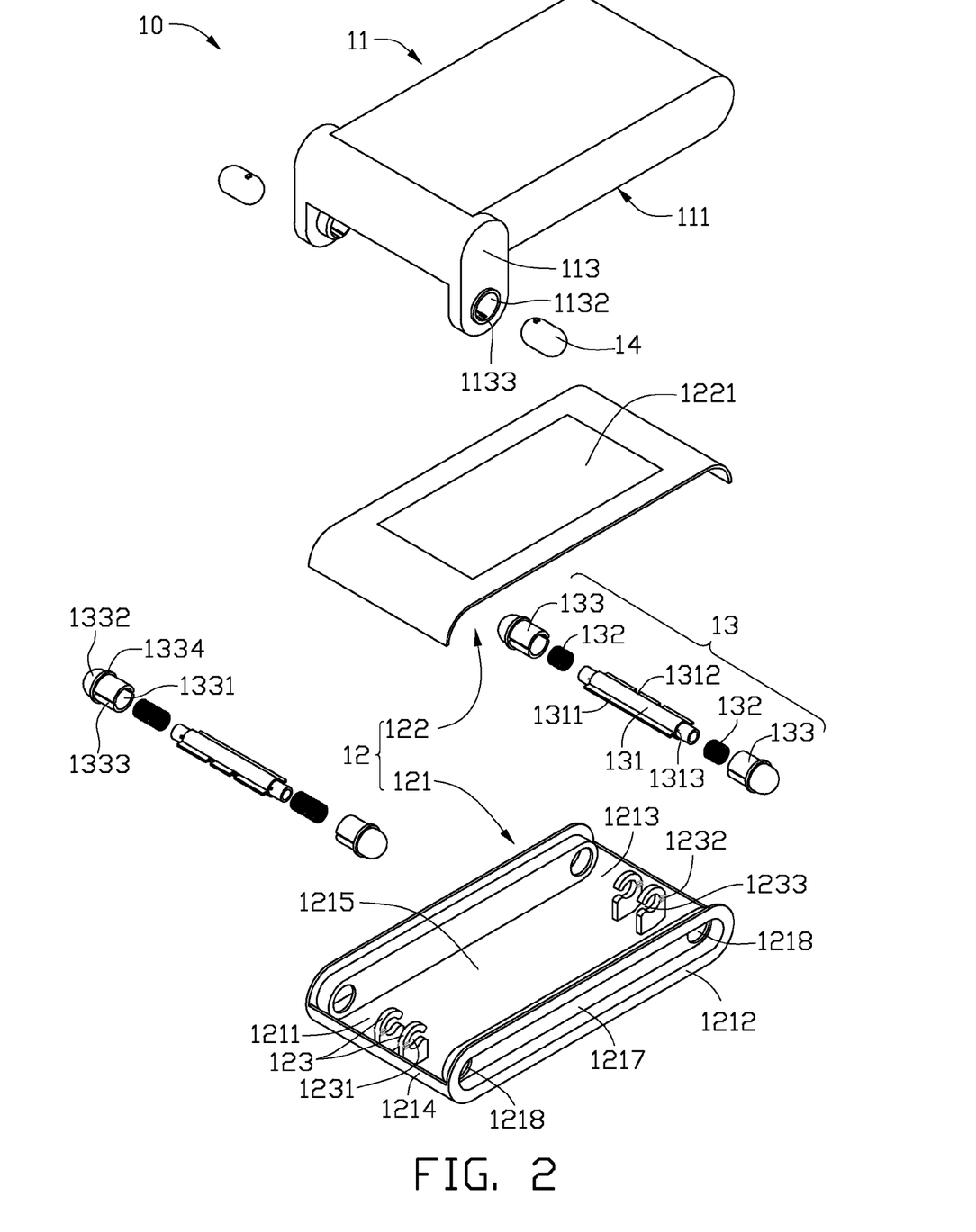
FIG. 2 is similar to FIG. 1, but viewed from another aspect.

FIGS. 1 and 2 show an exemplary portable electronic device 10. The portable electronic device 10 includes a body 11, a cover 12, two hinge assemblies 13, and two latches 14. The cover 12 is slidably hinged on the body 11 by the two hinge assemblies 13. The latches 14 are mounted to the body 11, and enable the hinge assemblies 13 to separate from the body 11.

The body 11 is a housing of the portable electronic device, including an operating surface 111 and two sidewalls 112 connected to the operating surface 111. A plurality of buttons 1111 are formed on the operating surface 111. A mounting board 113 is formed at one end of each sidewall 112. Each mounting board 113 has one end fastened to the sidewall 112, and the other end extending over the operating surface 111. Each mounting board 113 includes a protrusion 1131, the protrusions facing each other. In this embodiment, each protrusion 1131 is a hollow cylinder. The protrusion 1131 axially defines a channel 1132. In this embodiment, the channel 1132 is a round hole with an inner wall 1134 receiving a latch 14 therein. The inner wall 1134 longitudinally defines a limiting cutout 1133.

The cover 12 includes a first cover portion 121 and a second cover portion 122. The first cover portion 121 includes a second wall 1211, two sidewalls 1212, a first end wall 1213, and a second end wall 1214. A receiving cavity 1215 is cooperatively surrounded by the second wall 1211, the two sidewalls 1212, the first end wall 1213 and the second end wall 1214. The second cover portion 122 includes an interior display 1221 and an exterior display 1216. The interior display 1221 is large enough to support display of advanced functions of the portable electronic device. The exterior display 1216 is smaller than the interior display, and displays less and more basic information. Each sidewall 1212 defines a sliding slot 1217. Each end of each sliding slot 1217 defines a through hole 1218. Four mounting portions 123 are fixed to the second wall 1211 of the first cover portion 121. Two of the mounting portions 123 are adjacent to the first end wall 1213, and the other two mounting portions 123 are adjacent to the second end wall 1214. Each mounting portion 123 defines a pivoting hole 1231, coaxial with the through hole 1218. The mounting portion 123 includes a latching portion 1232 and a gap 1233 opposite to the latching portion 1232. The gap 1233 communicates with the pivoting hole 1231. The mounting portions 123 receive the hinge assemblies 13.

Each hinge assembly 13 includes a pivoting body 131, two elastic members 132 and two pins 133. The pivoting body 131 is generally a cylinder. Two ribs 1311 symmetrically protrude from a peripheral wall of the pivoting body 131. Two projections 1313 are formed on two opposite ends of the pivoting body 131. One rib 1311 defines two cutouts 1312, corresponding to the latching portions 1232. The cutouts 1312 latch the latching portion 1232 therein. The other rib 1311 is latched in the gap 1233 of the mounting portion 123, thus mounting the pivoting body 131 to the mounting portion 123.

The elastic member 132 is a compression spring disposed around one part of the pivoting body 131. One end of the elastic member 132 is fastened to the pivoting body 131 and the other is a free end partially received in and abutting the pins 133.

Each pin 133 is a hollow cylinder, and includes an open end 1331 and a resisting end 1332 opposite to the open end 1331. Two slits 1333 are symmetrically defined on a peripheral wall of the pin 133, adjacent to the open end 1331. The two slits 1333 slidably receive the two ribs 1311 therein, such that the pins 133 cannot rotate relative to the pivoting body 1311, but can slide along the ribs 1311. A flange 1334 is formed between the open end 1331 and the resisting end 1332. The flange 1334 abuts an inner surface of the sidewall 1212.

Each latch 14 includes a contact end 141, a push end 142 opposite to the contact end 141 and a limiting block 143 formed between the contact end 141 and the push end 142. The limiting block 143 is slidably received in the limiting slot 1133.

Figure 3:
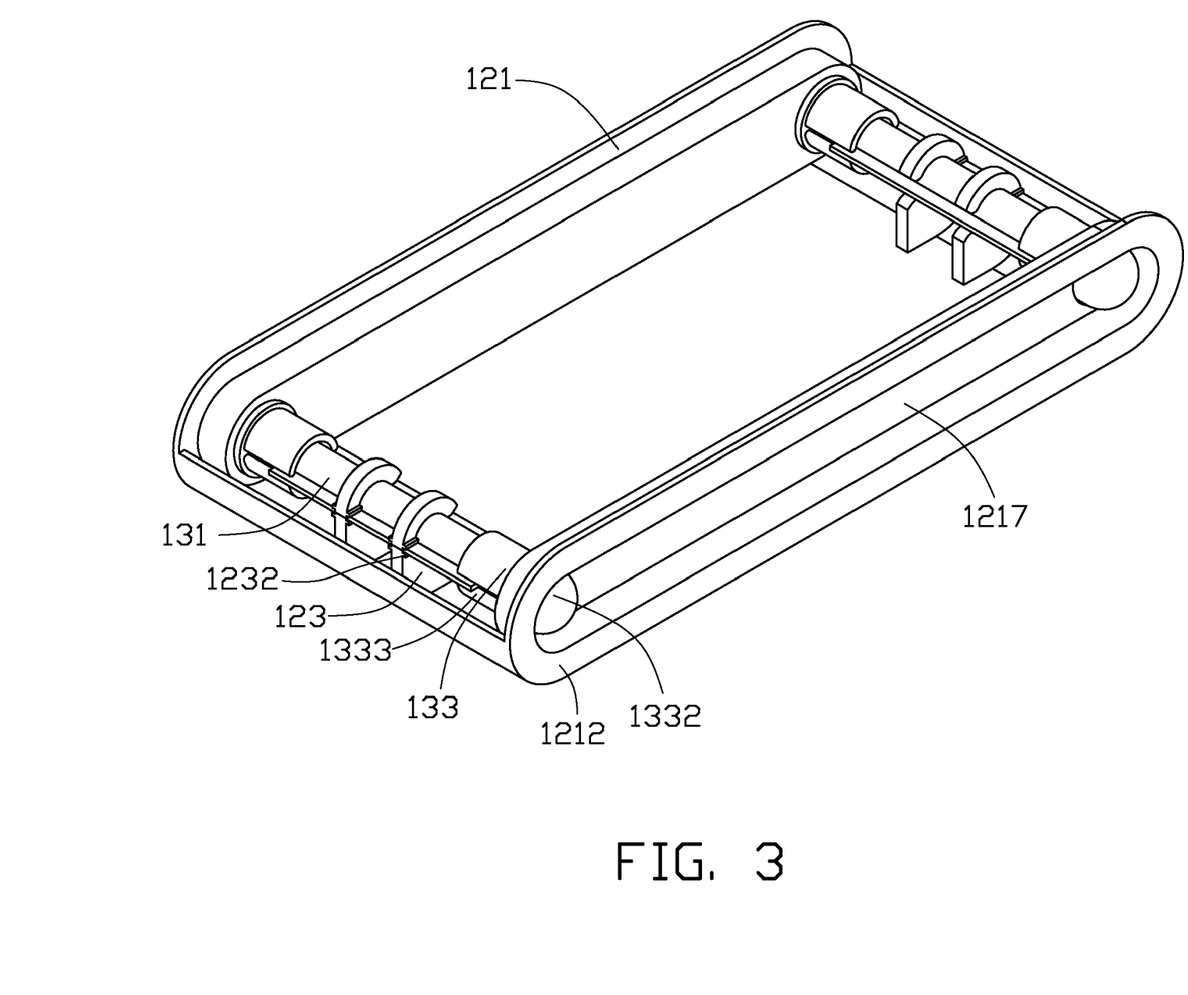
FIG. 3 is a partially assembled view of the portable electronic device shown in FIG. 2.
Figure 4:
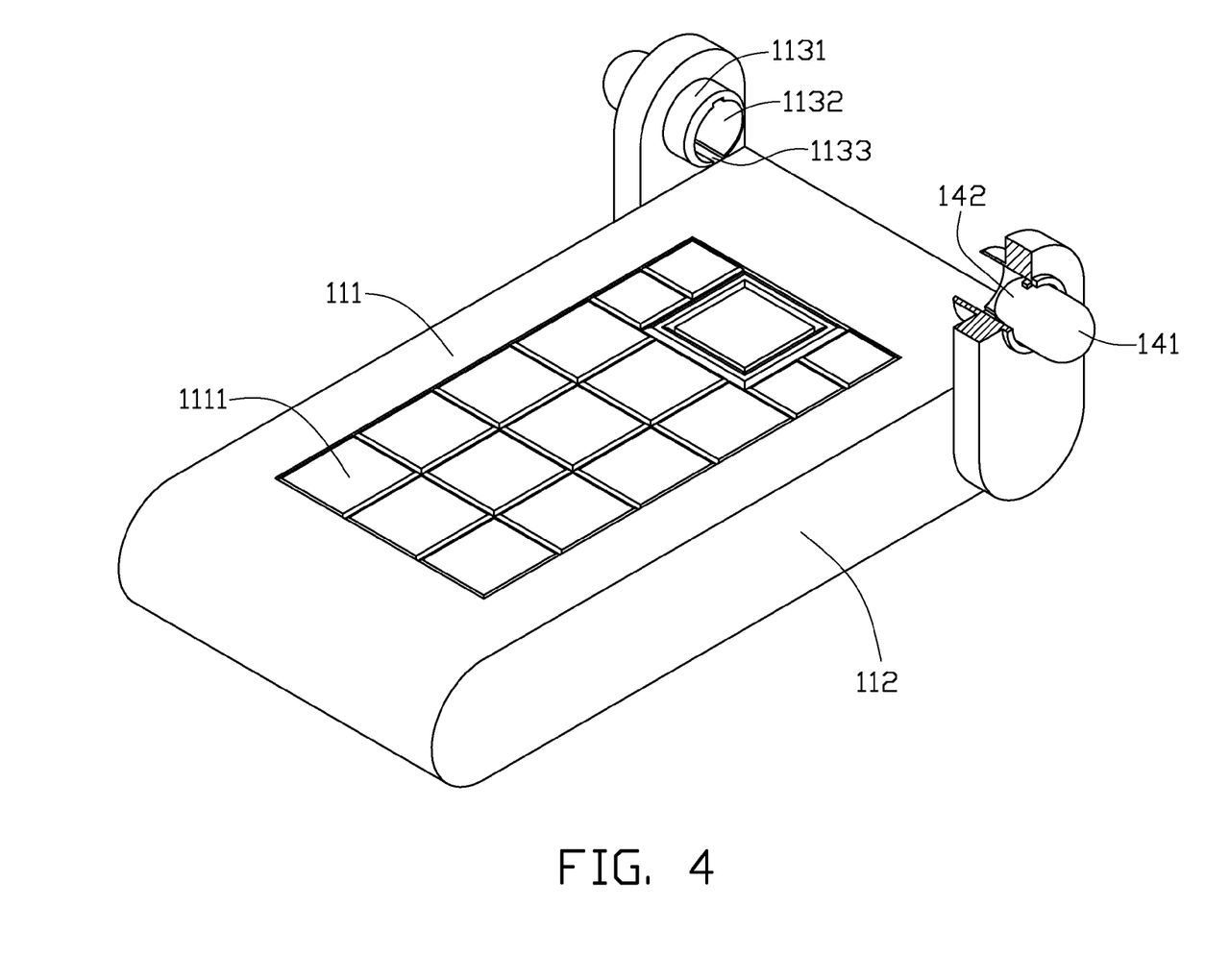
FIG. 4 is another partially assembled view of the portable electronic device shown in FIG. 2.
Figure 5:
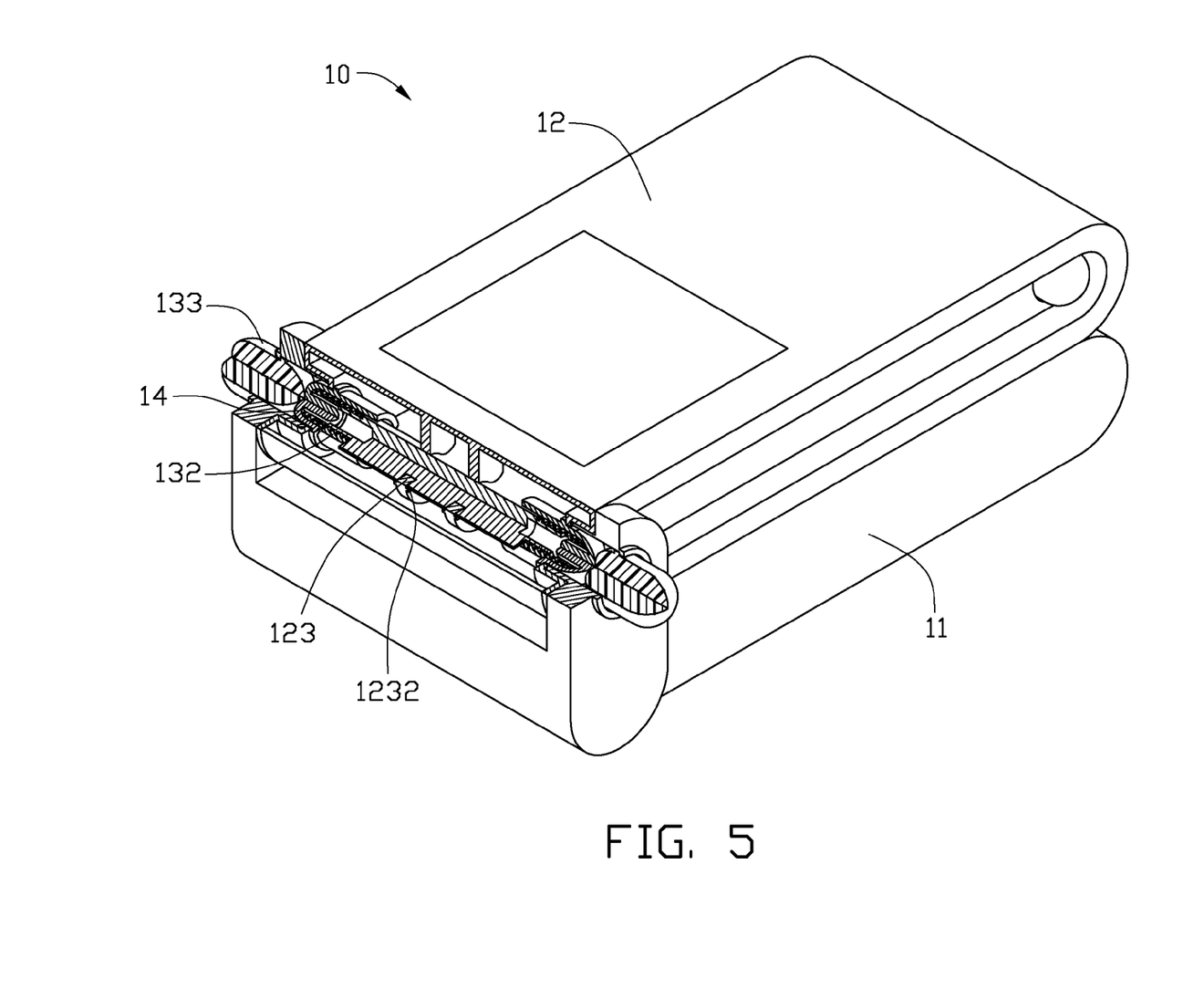
FIG. 5 is an assembled view of the portable electronic device shown in FIG. 2.

Referring to FIGS. 3 and 4, in assembly, the two hinge assemblies 13 are respectively mounted on the mounting portions 123 adjacent to the first end wall 1213 or the second end wall 1214. At this time, the flanges 1334 abut the inner surface of the sidewall 1212 of the cover 12 impelled by the elastic springs 132, and the resisting ends 1332 of the pins 133 are respectively received in the corresponding sliding slot 1217 through the through hole 1218. The two latches 14 are respectively received in the channel 1132 of the body 11. The limiting blocks 143 are slidably received in the limiting slots 1133 of the body 11. The cover 12 is received in the body 11 at an angle, with the two protrusions 1131 respectively received in the sliding slots 1217. The resisting ends 1332 of each pin 133 resist the latch 14, and are partially received in the channel 1132. The interior display 1221 faces the operating surface 111 of the body 11. Thus the portable electronic device 10 has been assembled.

Figure 6:
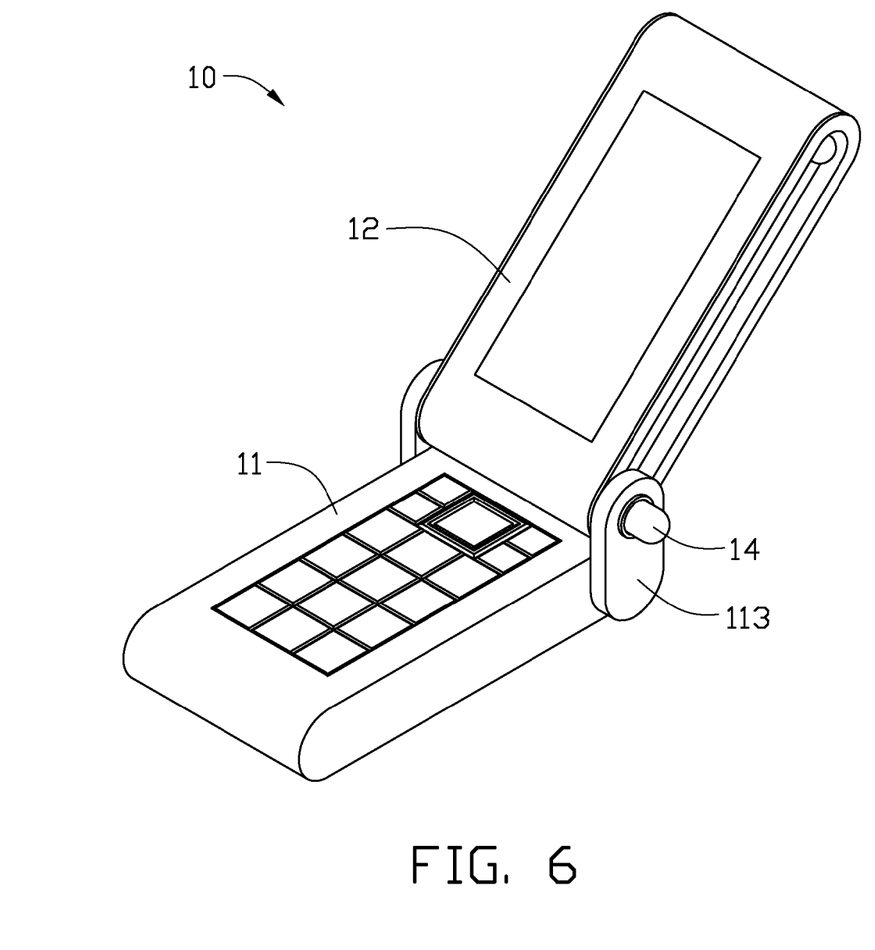
FIG. 6 is a schematic view of the portable electronic device shown in FIG. 2, in an open position.

To use the interior display 1221, the cover 12 is rotated about the pivoting body 131 adjacent to the second end wall 1214 until the buttons 1111 of the body 11 are exposed, at this time, the interior display 1221 is still facing the operating surface 111, and data can be input via the buttons 1111, as the interior display 1221 is visible.

Figure 7:
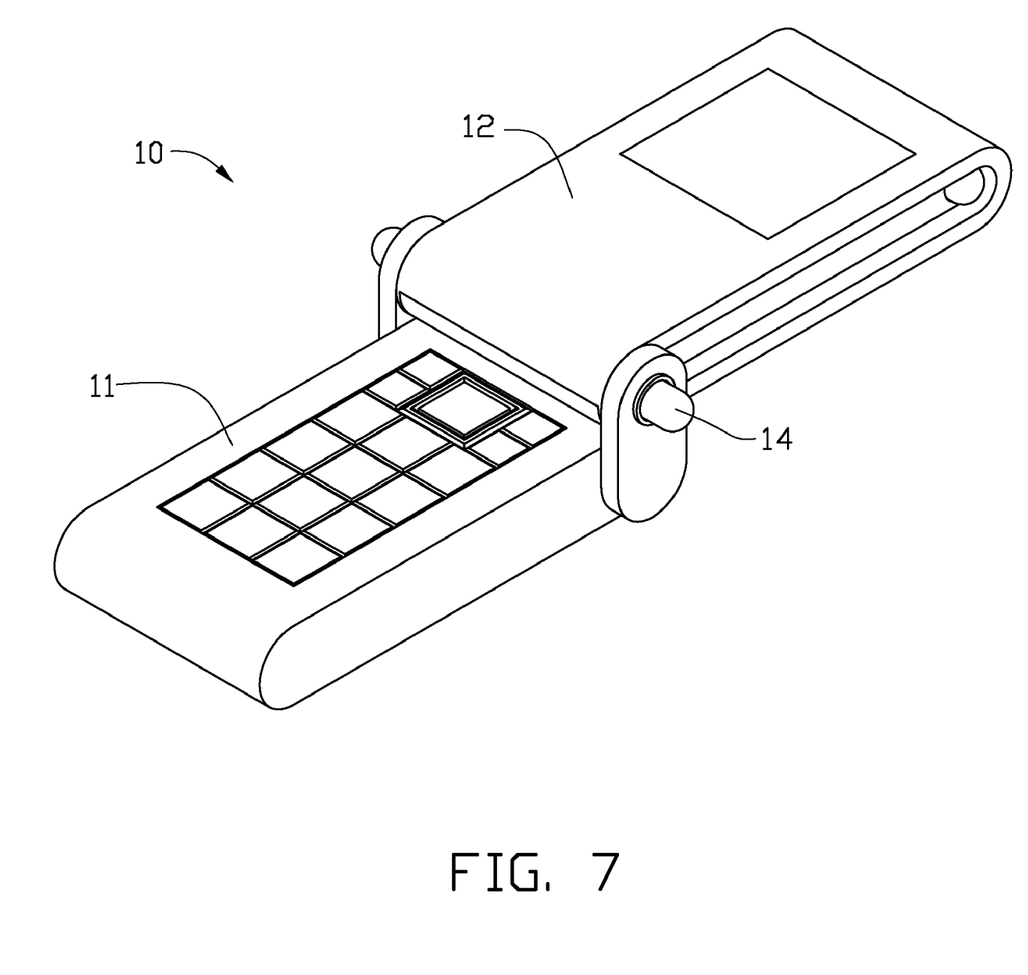
FIG. 7 is similar to FIG. 6, but shows another open position of the portable electronic device.

To use the exterior display 1216, the latches 14 are pushed towards each other until the resisting ends 1332 of the two corresponding pins 133 enter the through hole 1218 from the channel 1132. Cover 12 is slid along the sliding slot 1217 until the resisting ends 1332 of the pins 133 withdraw from the channel 1132 and are received in the sliding slots 1217 under the elastic members 132. The cover 12 continues to slide along the sliding slots 1217 until two pins 133 of the other hinge assembly 13 resist the protrusions 1131. Because the resisting end 1332 has a spherical contour, the resisting ends 1332 are easily latched in the channels 1132 by the elastic members 132. Thus the cover 12 hinges on the pivoting body 131 adjacent to the first end wall 1213 to expose the buttons 1111, with the exterior display facing the operating surface 111, allowing input via the buttons 1111, with the interior display 1221 visible.

In other embodiments, the hinge assembly and latches can be omitted, and the cover slid relative to the body, and hinge on the protrusion relative to the body.

The cover can not hinge relative to the body, but also rotate about the protrusions relative to the body, exposing the interior display with the exterior display selectively facing the operating surface and the body.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A portable electronic device comprising:
   a cover comprising a first end wall, a second end wall opposite to the first end wall, and a sidewall connecting the first end wall and the second end wall, the sidewall defining a sliding slot, two ends of the sliding slot respectively extending to the first end wall and the second end wall; and
   a body comprising a protrusion formed thereon, slidably received in the sliding slot to allow the protrusion to slide to the first end wall or the second end wall;
   a hinge assembly including a pivoting body and a pin, the pivoting body fastened to the cover, the pin mounted to the sliding slot, and slidably attached to the pivoting body and releasably latching with the protrusion;
   an elastic member;
   wherein the protrusion defines a channel, and the pin is mounted within the cover, and releasably latches in the channel; one end of the elastic member is fastened to the pivoting body, the other end resists the pin towards the sliding slot.

2. The portable electronic device as claimed in claim 1, wherein the cover comprises an exterior display formed on a side thereof and an interior display on an opposite side thereof, the body comprises buttons formed thereon, one of the exterior display or the interior display selectably facing the buttons.

3. The portable electronic device as claimed in claim 1, wherein the sliding slot defines a through hole communicating with the channel, and the pin latches in the channel through the through hole.

4. The portable electronic device as claimed in claim 1, wherein the pin receives the pivoting body therein and slides relative to the pivoting body.

5. The portable electronic device as claimed in claim 1, further comprising a latch, wherein the pin comprises an open end and a resisting end opposite to the open end, the open end receives the pivoting body therein, the resisting end is releasably latched in the channel, and the latch is slidably received in the channel and impels the resisting end out of the channel.

6. The portable electronic device as claimed in claim 5, wherein the channel is surrounded by an inner wall axially defining a limiting slot, the latch comprises a limiting block, and the limiting block is received in the limiting slot.

7. The portable electronic device as claimed in claim 1, further comprising a plurality of mounting portions on which the pivoting body is mounted.

8. The portable electronic device as claimed in claim 1, wherein two ribs symmetrically protrude from the pivoting body, and two slits are symmetrically defined in the pin, adjacent to the open end, slidably receiving the two ribs therein.

9. The portable electronic device as claimed in claim 1, wherein two projections are formed on the pivoting body, and one end of the elastic member is fastened to the two projections.

10. A portable electronic device comprising:
    a cover having two ends, a first and second sides and defining a longitudinal sliding slot along each longitudinal edge of the cover, an exterior display formed on the first side of the cover and an interior display formed on the second side of the cover;
    a body including two protrusions and buttons formed thereon, each protrusion slidably received in one of the sliding slots;
    a lockable hinge assembly mounted to each end of the cover, each hinge assembly mounted to a corresponding sliding slot, and latchable in a corresponding protrusion; and
    wherein when the cover is slid and rotated in a first direction relative to the body, one of the exterior and interior displays is visible to the user; and
    wherein when the cover is slid and rotated in a second direction relative to the body, the other of the exterior and interior display is visible to the user, the cover is rotated around one hinge assembly to expose one of the exterior display and the interior display, the hinge assembly is pressed to withdraw from the protrusions to allow the cover to slide along the sliding slots until the other hinge assembly is engaged in the protrusions, the cover is rotated around the other hinge assembly to expose the other of the exterior display and the interior display facing the button.

11. The portable electronic device as claimed in claim 10, wherein each hinge assembly includes a pivoting body and a pin, the pivoting body is fastened to the cover, the pin is slidably attached to the pivoting body and is releasably latching with a corresponding protrusion.

12. The portable electronic device as claimed in claim 11, wherein each hinge assembly further includes an elastic member, one end of the elastic member is fastened to the pivoting body, and the other end resists the pin towards the sliding slot.

13. The portable electronic device as claimed in claim 12, wherein each protrusion defines a channel, and the pins are mounted within the cover, and releasably latch in the channel.

14. The portable electronic device as claimed in claim 13, further comprising a latch, wherein each pin comprises an open end and a resisting end opposite to the open end, the open end receives the pivoting body therein, the resisting end is releasably latched in the channel, and the latch is slidably received in the channel and impels the resisting end out of the channel.

15. A portable electronic device comprising:
a first member;
a second member;
two hinge assemblies mounted to two ends of the first member,
two opposite protrusions provided on the second member;
a sliding slot provide on both sides of the first member, one hinge assembly connected to one end of the sliding slots, the other hinge assembly connected to the other end of the sliding slots, and the hinge assemblies releasably latched in a corresponding protrusion; and
wherein when the first member is closed to the second member, the first member is rotated around one hinge assembly to a predetermined position, the hinge assembly is pressed to withdraw from the protrusions to allow the first member to slide along the sliding slots until the other hinge assembly is engaged in the protrusions.

* * * * *